United States Patent
Oldham et al.

(10) Patent No.: US 10,670,874 B2
(45) Date of Patent: Jun. 2, 2020

(54) LIGHT-COLLIMATING TANK FOR USE WITH AN OPTICAL COMPUTED TOMOGRAPHY SYSTEM

(71) Applicant: Duke University, Durham, NC (US)

(72) Inventors: Mark Oldham, Durham, NC (US); Devin Miles, Durham, NC (US)

(73) Assignee: Duke University, Durham, NC (US)

( * ) Notice: Subject to any disclaimer, the term of this patent is extended or adjusted under 35 U.S.C. 154(b) by 43 days.

(21) Appl. No.: 15/941,149

(22) Filed: Mar. 30, 2018

(65) Prior Publication Data
US 2018/0284473 A1    Oct. 4, 2018

Related U.S. Application Data

(60) Provisional application No. 62/478,700, filed on Mar. 30, 2017.

(51) Int. Cl.
*G02B 27/30* (2006.01)
*G01B 9/02* (2006.01)
*G02B 3/12* (2006.01)

(52) U.S. Cl.
CPC ......... *G02B 27/30* (2013.01); *G01B 9/02091* (2013.01); *G02B 3/12* (2013.01)

(58) Field of Classification Search
CPC combination set(s) only.
See application file for complete search history.

(56) References Cited

U.S. PATENT DOCUMENTS

| | | | |
|---|---|---|---|
| 4,575,330 A | 3/1986 | Hull | |
| 5,121,329 A | 6/1992 | Crump | |
| 7,098,463 B2 | 8/2006 | Adamovics | |
| 9,357,925 B2 | 6/2016 | Adamovics | |
| 2015/0036141 A1* | 2/2015 | Adamovics | A61B 5/0073 356/432 |

OTHER PUBLICATIONS

Alqathami, et al., "Evaluation of ultra-sensitive leucomalachite dye derivatives for use in the PRESAGE dosimeter," Radiation Physics and Chemistry, vol. 85, 2013.
(Continued)

*Primary Examiner* — Tony Ko
(74) *Attorney, Agent, or Firm* — Quarles & Brady LLP

(57) ABSTRACT

An optical computed tomography system for comprehensive end-to-end verification of the delivered dose in phantoms is described. The optical computed tomography system includes a light source that emits light; a detector; and a light-collimating tank arranged between the light source and the detector. The light-collimating tank itself includes a transparent substrate having a recessed region formed therein; an incident light surface formed on the transparent substrate; and an exit light surface formed on the transparent substrate opposite the incident light surface and shaped to focus light toward a focal region located outside of the transparent substrate. In some configurations, the incident light surface is shaped to collimate light impinging on the incident light surface into parallel rays that pass through the tank towards the exit light surface.

23 Claims, 4 Drawing Sheets

(56) References Cited

OTHER PUBLICATIONS

Bache S., "Investigation of High Resolution 3D Rodent Morphic Dosimetry, and Cost Effective Optical CT using Fresnel Lenses," MS Thesis, Medical Physics Graduate Program, Duke University, Durham, NC. 2014.
Bache, S., et al. "SU-E-J-164: An Investigation of a Low-Cost 'dry'Optical-CT Scanning System for 3D Dosimetry." Medical Physics 41.6 Part 9 (2014): 194-194.
Bache S., "Investigating the accuracy of microstereotactic-body-radiotherapy utilizing anatomically accurate 3D printed rodent-morphic dosimeters," Med. Phys., vol. 42, No. 846, 2015.
Bogdanich, W. "Radiation Offers New Cures, and Ways to Do Harm". New York Times, Jan. 23, 2010.
Bogdanich, W. "As Technology Surges, Radiation Safeguards lag". New York Times, Jan. 26, 2010.
Chisholm et al. "Investigations into the feasibility of optical-CT 3D dosimetry with minimal use of refractively matched fluids". Medical Physics, 42(5) p2607 (2015).
Cramer et al., "Treatment Planning and Delivery of Whole Brain Irradiation with Hippocampal Avoidance in Rats," PLOS One, vol. 10, No. 12, 2015.
Fedorov A., "3D Slicer as an Image Computing Platform for the Quantitative Imaging Network," vol. 30, No. 9, 2012.
Ghia, A., et al., "Distribution of brain metastases in relation to the hippocampus: implications for neurocognitive functional preservation," vol. 68, 2007.
Gondi V., et al., "Estimated of perihippocampal disease progression after hippocampal avoidance during whole-brain radiotherapy: Safety Profile for RTOG 0933," Radiother. Oncol, vol. 95, 2010.
Guo, P. et al., "A practical three-dimensional dosimetry system for radiation therapy," Med. Phys., vol. 33, No. 10, 2006.
Herman, M. Statement on behalf of the American Association of Physicists in Medicine (AAPM) at the hearing before the Subcommittee on Health of the Committee on Energy and Commerce, U.S. House of Representatives, Feb. 26, 2010. Serial No. 111-100. pp. 40-42.
Ibbott GS. QA in radiation therapy: the RPC perspective. J Phys Conf Ser 2010; 250: 1-7.
Juang, T. "Clinical and Research Applications of 3D Dosimetry," Ph. D. dissertation, Medical Physics Graduate Program, Duke University, Durham, NC 2015.
Juang, T. et al, "On the need for comprehensive validation of deformable image registration, investigated with a novel 3D deformable dosimeter," Int. J. Radiat. Oncol. Biol. Phys., vol. 87, No. 2, 2013.
Juang, T. et al., "Characterization of a reusable PRESAGE® 3D dosimeter," Journal of Physics: Conference Series, vol. 573, 2015.
Juang, T. et aL, "On the feasibility of comprehensive high-resolution 3D remote dosimetry," Medical Physics, vol. 41, 2014.
Kodama H., "Automatic method for fabricating a three-dimensional plastic model with photo-hardening polymer," Rev. Sci. Instrum., vol. 52, No. 11, 1981.
Li, G., "Evaluation of the sensitivity of two 3D diode array dosimetry systems to setup error for quality assurance (QA) of volumetric-modulated arc therapy (VMAT)," Journal of Applied Clinical Medical Physics, vol. 14, No. 5, 2013.
Luxexcel, "Printoptical technology and 3D printing of functional optics," Luxexcel, 2016. [Online]. Available: http://www.luxexcel.com/printed-optics/.
Malcolm, J., "Design, Evaluation and First Applications of a Off-Site State-Of-The-Art 3D Dosimetry System," MS Thesis, Medical Physics Graduate Program, Duke University, Durham, NC 2015.
Mein, et al., "Development of a 3D remote dosimetry protocol compatible with MRgIMRT," Med. Phys. 44(11) Nov. 2017.
Molineu, et al., "Credentialing results from IMRT irradiations of an anthropomorphic head and neck phantom," vol. 40, 2013.
Moran et al., Safety Considerations for IMRT: Executive Summary. Pract. Oncol. 1:190-195 (2011).
Mehta et al., "RTOG 0933: A Phase II Trial of Hippocampal Avoidance During Whole Brain Radiotherapy for Brain Metastases," Radiation Therapy Oncology Group, 2012.
National Cancer Institute, "Cancer Statistics," Mar. 14, 2016. [Online]. Available: http://www.cancer.gov/about-cancer/what-is-cancer/statistics.
National Institute of Standards and Technology, XCOM Database. Last Update to Data Content: Nov. 2010.
Oldham, M. ScanSim: A Tool for Simulating Optical-CT Imaging. Journal of Physics. Conference Series, 250(1), 311-315 (2010).
Oldham, Mark. "Methods and techniques for comprehensive 3D dosimetry." Adv. Med. Phys.—2014 (2014): 69-86.
Rankine, et al. "Three-Dimensional Dosimetric Validation of a Magnetic Resonance Guided Intensity Modulated Radiation Therapy System," International Journal of Radiation Oncology, vol. 97, No. 5, 1095-1104 (2017).
Rodrigues, "Toward Accurate Small Animal Dosimetry and Irradiator Quality Assurance," MS Thesis, Medical Physics Graduate Program, Duke University, Durham, NC 2012.
Samal, P., "A Brief Discussion of Color," Lecture, U Mass Amherst, 2010.
Smith, S., "Chapter 25: Special Imaging Techniques," in The Scientist and Engineer's Guide to Digital Signal Processing, California Technical Publishing, 2011.
Talmadge, et al., "Murine Models to Evaluate Novel and Conventional Therapeutic Strategies for Cancer," American Journal of Pathology, vol. 170, No. 3, 2007.
Thomas, A., et al., Commissioning and benchmarking a 30 dosimetry system for clinical use. Medical Physics, 38(8), 4846-4857 (2011).
Medical Physics Web "3D dosimetry protocol is compatible with MR-guided radiotherapy", MedicalPhysicsWeb, Dec. 18, 2017.
3Dprinting.com, "What is 3D printing?," 2016. [Online]. Available: http://3dprinting.com/what-is-3d-printing/.
Turner MedTech, "Application Note: Radiation Shielding Components using GMASS," [Online]. Available: https://turnermedtech.com/assets/application-note-gmass.pdf.
Van Dyk, J., The Modern Technology of Radiation Oncology, Medical Physics Publishing, 1999.
Verhaegen, F., "Small animal radiotherapy research platforms," Physics in Medicine and Biology, vol. 56, 2011.

* cited by examiner

FIG. 5A-D

LIGHT-COLLIMATING TANK FOR USE WITH AN OPTICAL COMPUTED TOMOGRAPHY SYSTEM

CROSS-REFERENCE TO RELATED APPLICATIONS

This application claims the benefit of U.S. Provisional Patent Application Ser. No. 62/478,700, filed on Mar. 30, 2017, and entitled "ECONOMICAL DRY-TANK OPTICAL CT SCANNER AND METHODS OF USING THE SAME."

BACKGROUND

Radiation therapy is a principle treatment modality for many cancers and other diseases. In the last 15 years, the sophistication, precision, and capabilities of these treatments has increased dramatically. Examples include intensity-modulated-radiation-therapy (IMRT), volumetric-modulated-radiation-therapy (VMAT), MRI guided radiation therapy (e.g., Viewray), stereotactic-body-radiation therapy (SBRT), and many others. These techniques have extraordinary capability to deliver complex three dimensional (3D) distributions of dose that conform to even irregularly shaped lesions in the patient. The increased complexity or delivery technology has led to a need for new verification methods and technologies in order to strengthen the foundations of quality assurance (QA) in radiation therapy (RT). Such end-to-end verification has long been a critical final step performed during commissioning of new RT techniques and devices, prior to their implementation in the clinic.

Historically, end-to-end verification and commissioning of advanced RT techniques has been performed by labor intensive procedures with poor spatial resolution (e.g., using film phantoms). More comprehensive 3D dosimetry techniques have been developed, with notable examples being PRESAGE® (Heuris, Inc., Skillman, N.J.), Fricke gels, and BANG gels (MGS Research, Inc., Madison, Conn.). However, their implementation in clinical practice has been heavily slowed by many factors, including expense, volatility, the need for extensive training and expertise, and inflexible phantom geometries. PRESAGE® dosimeters, in particular, are able to address most of these issues, but expensive optical scanning tools are necessary for dose readout. One example of such a costly system is the Duke Large field of view Optical Scanner (DLOS) system developed at Duke (Thomas et al. 2011). In the DLOS system, the telecentric lenses and fluid tank (and fluid accessories) contribute to over 60% of the total cost.

To improve accessibility of comprehensive 3D dosimetry techniques, there is a desire for a low-cost, reliable, and easy-to-use 3D dosimetry system.

SUMMARY OF THE DISCLOSURE

The present disclosure addresses the aforementioned drawbacks by providing a novel, efficient, and low-cost system for comprehensive end-to-end verification of the delivered dose in phantoms. The system uses a solid, economical light-collimating tank with one or more light surfaces shaped to focus or collimate light. In this manner, the system can function without the need for expensive telecentric lenses and with only a small amount of RI fluid when compared to previous designs.

In one aspect, the present disclosure provides a light-collimating tank for an optical computed tomography scanner. The light-collimating tank includes a transparent substrate having a recessed region formed therein; an incident light surface formed on a first side of the transparent substrate; and an exit light surface formed on a second side of the transparent substrate that is opposite the first side, the exit light surface being shaped to focus light toward a focal region located outside of the transparent substrate.

In another aspect, the present disclosure provides an optical computed tomography system. The optical computed tomography system includes a light source that emits light; a detector that detects light; and a tank arranged between the light source and the detector. The tank comprising a transparent substrate having a recessed region formed therein; an incident light surface formed on the transparent substrate; and an exit light surface formed on the transparent substrate opposite the incident light surface and shaped to focus light toward the detector.

The foregoing and other aspects and advantages of the present disclosure will appear from the following description. In the description, reference is made to the accompanying drawings that form a part hereof, and in which there is shown by way of illustration a preferred embodiment. This embodiment does not necessarily represent the full scope of the invention, however, and reference is therefore made to the claims and herein for interpreting the scope of the invention.

DETAILED DESCRIPTION

Many of the components of previous 3D dosimeter end-to-end verification systems are large and extremely expensive. In particular, these systems often use telecentric lenses and fluid tank filled with a large volume (e.g., liters) of refractive index matching fluid, making them impractical options for general clinical use. As a result, telecentric optical scanners can only be found in a handful of major research institutions, such as Princess Margaret Hospital in Toronto, or IROC in Houston.

To address the deficiencies of these previous systems, the present disclosure provides a solid tank, or "light-collimating tank", that eliminates the need for multiple liters of refractive index (RI) fluid for high-quality light transmission. Further, by curving the incident and/or exit light surfaces of the RI-matched solid tank, the facing surfaces of the tank can effectively operate as large convex lenses. At precise lens curvature and focal distances, it becomes possible to create a collimated light field within the tank that originates from a diverging point light source. Un-scattered light that passes through the lens is able to re-converge onto a detector. Based on the information received from the detector, end-to-end verification of a 3D radiation treatment can be achieved.

Figure 1:
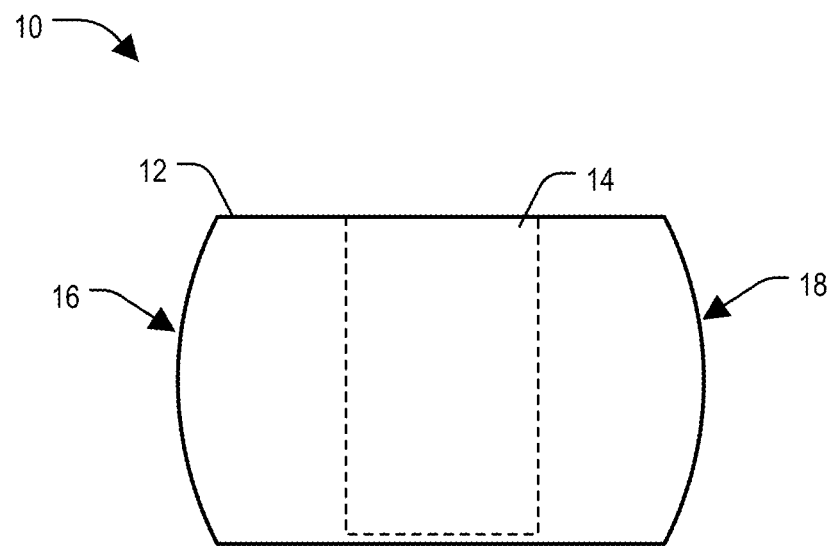
FIG. 1 depicts an example of a light-collimating tank for use with an optical computed tomography system, wherein the light-collimating tank is designed to collimate incident light into parallel rays that pass through a recessed region in the light-collimating tank before impinging on an exit surface where the parallel rays of light are focused toward a focal region outside of the light-collimating tank.
Figure 2:
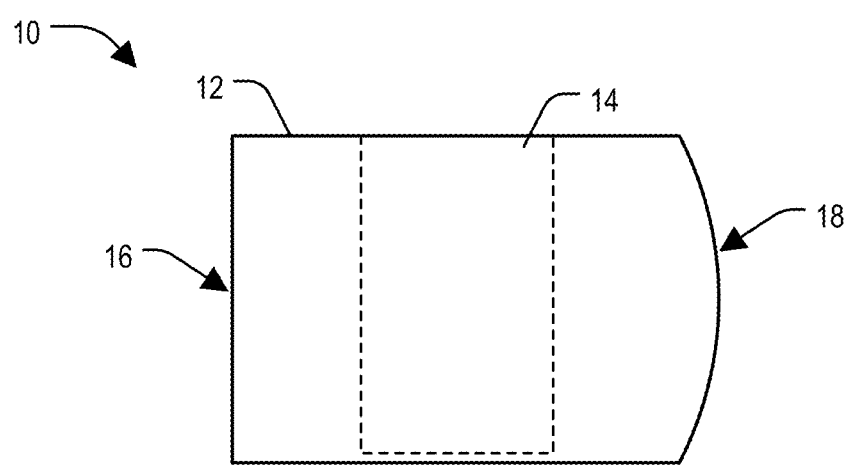
FIG. 2 depicts another example of a light-collimating tank for use with an optical computed tomography system, wherein the light-collimating tank is designed to receive incident light that has been collimated into parallel rays that will therefore pass through a recessed region in the light-collimating tank before impinging on an exit surface where the parallel rays of light are focused toward a focal region outside of the light-collimating tank.

In one aspect, the present disclosure provides a light-collimating tank for an optical computed tomography scanner, as shown in FIGS. 1 and 2. The light-collimating tank 10 can include a transparent substrate 12 having a recessed region 14 formed therein; an incident light surface 16 formed on a first side of the transparent substrate 12; and an exit light surface 18 formed on a second side of the transparent substrate 12 that is opposite the first side. The exit light surface 18 is shaped to focus light toward a focal region located outside of the transparent substrate 12.

The incident light surface 16 of the light-collimating tank 10 may be shaped to collimate light incident on the incident light surface 16 into parallel rays that pass through the recessed region 14 of the transparent substrate 12 toward the exit light surface 18, as shown in FIG. 1. In some other embodiments, such as the one shown in FIG. 2, the incident light surface 16 can be shaped as a flat (e.g., planar) surface. The incident light surface 16, the exit light surface 18, or both, may be partially or completely shaped into convex surfaces. The curvature of the convex surface of the incident light surface 16 in such configurations may vary depending on the distance of the light-collimating tank 10 from a light source in an optical computed tomography system. Similarly, the curvature of the convex surface of the exit light surface 18 in such configurations may vary depending on the distance of the light-collimating tank 10 from an intended focal region, such as a focal region coincident with a detector of an optical computed tomography system. In some implementations, the incident light surface 16, the exit light surface 18, or both, are smooth surfaces. In some other implementations, incident light surface 16, the exit light surface 18, or both, may be partially or completely shaped to resemble a Fresnel lens or a similar configuration capable of collimating or focusing light, as desired. The shape of the incident light surface 16 may collimate light in a direction that is perpendicular or substantially perpendicular to the incident light surface 16.

The transparent substrate 12 of the light-collimating tank 10 may include a substantially transparent material. For instance, the transparent substrate 12 may be composed of a material that is optically transparent for a particular wavelength or range of wavelengths of light. In this manner, the transparent substrate 12 of the light-collimating tank 10 can be composed of a material that is selected based on the wavelength, or range of wavelengths, of incident light that will be used in an optical computed tomography system. The transparent substrate 12 of the light-collimating tank 10 may be composed of a polymer, such as polyurethane. The refractive index of the transparent substrate 12 of the light-collimating tank 10 may be matched to be similar to the refractive index of the material used in a 3D radiation dosimeter (e.g., PRESAGE® or other dosimeter material) and of the RI fluid that are both intended to be placed within the recessed region 14 of the light-collimating tank 10. The light-collimating tank 10 may have additional optical properties that are advantageous for its intended function of collimating incident light and focusing light exiting the exit light surface 18 of the light-collimating tank 10. For example, the light-collimating tank 10 may have low reflectance properties. In some configurations, the transparent substrate 12 may be doped with an absorbing dye that allows the tank 10 to partially absorb transmitted light. The size of the light-collimating tank 10 may vary depending on the size of the dosimeter that will be imaged.

The recessed region 14 of the light-collimating tank 10 may be sized to be slightly larger than the radiation dosimeter and have a substantially similar shape. In this manner, the radiation dosimeter may be inserted into the recessed region 14 with minimal negative space or gaps present. This configuration reduces the amount of any RI fluid necessary to fill these gaps. The recessed region 14 may be cylindrical in shape. In some embodiments, the recessed region 14 extends only partially into the transparent substrate 12, as shown in FIGS. 1 and 2. In other embodiments, the recessed region 14 can extend fully through the transparent substrate.

In another aspect, the present disclosure provides an optical computed tomography system. The optical computed tomography system can include a light source that emits light; a detector; and a tank arranged between the light source and the detector. The tank can include a transparent substrate having a recessed region formed therein; an incident light surface formed on the transparent substrate; and an exit light surface formed on the transparent substrate opposite the incident light surface and shaped to focus light toward a focal region located outside of the transparent substrate.

The light emitted from the light source can strike the incident light surface where it is collimated into parallel rays that pass through tank and the recessed region towards the exit light surface. Any radiation dosimeter present within the recessed region may contain regions of different color or optical properties that can alter any collimated rays that contact them. In this manner, these regions of different optical properties, produced by irradiation of the dosimeter, can be imaged and located. Once the light strikes the exit light surface, the light is focused towards a focal region located outside of the transparent substrate where it is detected by a detector.

The light source may be configured to produce a uniform emission of light rays. The light rays produced may be within a specific range of wavelengths. The light source may be a light emitting diode (LED), a compact fluorescent bulb, a halogen bulb, an incandescent bulb, or another light source well known in the art. In some embodiments, the light source may be a single LED. There may be multiple light sources in some configurations. For instance, the light source may include an array of LEDs. The light source may be specifically positioned at a distance or location relative to the tank that improves the quality of the light collimation at the incident light surface.

The detector may be configured to detect light rays that are focused by the exit light surface. The light rays detected may be limited to within a specific range of wavelengths. The detector may include a charge-coupled device (CCD) image sensor, a complementary metal-oxide semiconductor (CMOS) image sensor, a digital single-lens reflex (DSLR) camera, or another detector well known in the art. As a non-limiting example, the detector may be a 12-bit CCD camera. There may be multiple detectors in some configurations. The detector may be positioned at a distance or location relative to the tank that improves the quality of the light detected. The detector may be located at or near the focal region. The detector may in some embodiments also include a focusing lens arranged between the exit light surface and the detector. In such instances, the focusing lens may be used to filter out scattered light in order to compensate for imperfect curvature of the light exit surface. An aperture may also be interposed between the exit light surface and the detector. Further, the inclusion of scatter rejection can be used to reduce penumbra blurring and sharpen feature resolution. This can be accomplished by a number of techniques, such as the addition of light-polarizing filters, or the inclusion of a telecentric lens on the camera.

A dosimeter may be located within the recessed region of the tank and may be configured to be both removable and replaceable. The dosimeter may include an optically transparent polyurethane matrix doped with a small percentage of photo-radical initiator and leuco-dye. Upon irradiation, the initiator may release free radicals into the polyurethane matrix, which are able to oxidize the leuco-dyes and cause a color change. Analogous to radiochromic film, the color change can be localized to the exposed volume of the dosimeter. Other substances capable of producing an optical change when irradiated may be used within the dosimeter. The dosimeter may be connected to a rotation system (e.g., a rotation stage) configured to rotate the light-collimating tank about an axis of rotation through a number of different view angles relative to the incident light surface of the tank. The rotation system may be configured to repeatedly rotate the dosimeter a predetermined angle after a set period of time. In this manner, tomographical image data can be obtained at a number of different view angles.

The refractive index fluid may be located within the recessed region between the dosimeter and the transparent substrate. The transparent substrate, the dosimeter, and the refractive index fluid may all have about the same refractive index. If these three components all have about the same refractive index, the calculations associated with image reconstruction may be simplified, although having about the same refractive index is not necessarily required. The refractive index fluid present within the system may have a total volume of less than 100 mL, 50 mL, 25 mL, 10 mL, 8 mL, 5 mL, 4 mL, 3 mL, 2 mL, 1 mL, or 0.5 mL. The refractive index fluid may in some embodiments have a total volume less than 5 mL.

The optical computed tomography system may in some implementations include a parallel collimator arranged at the incident light surface such that light incident on the parallel collimator is collimated into parallel rays that impinge upon the incident light surface. For example, the parallel collimator might be a parallel hole collimator. When the parallel collimator is present, the incident light surface may be a flat surface. Regardless of the configuration, the optical computed tomography system may include a diffuser located between the light source and the tank. When the diffuser is positioned in close proximity to the incident light surface of the light-collimating tank, a high degree of light may be unpredictably scattered at incidence. Thus, in these embodiments the incident light surface can remain flat, and instead the diffuser and parallel collimator (e.g., parallel-hole collimator, collimating lens) can be used, as mentioned above.

Minor flaws in the light-collimating tank (e.g., dust, bubbles, flawed curvature) may be present in pre- and post-irradiation optical scans, and can be removed with optical density correction techniques. These techniques may reduce image noise from artifacts of fluid tank scanning.

Figure 3:
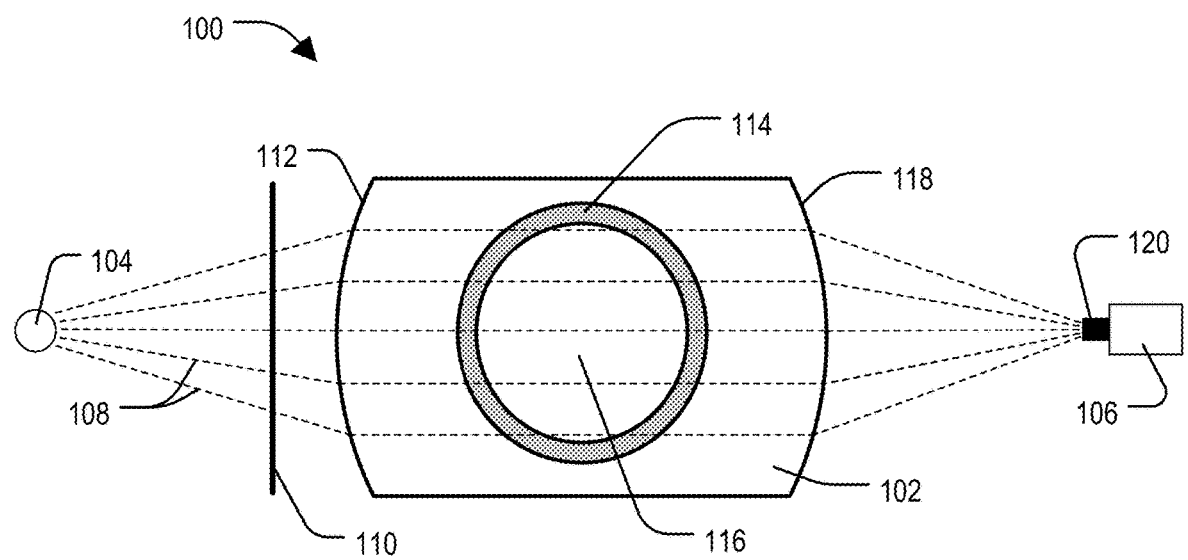
FIG. 3 depicts an optical computed tomography system in accordance with the teachings of the present disclosure.

Turning more specifically to the figures, FIG. 3 depicts a top view of an optical computed tomography system 100 with a tank 102, a light source 104, and a detector 106. Light rays 108 are depicted as dotted lines and are emitted from the light source 104 and are incident on an incident light surface 112 of the tank 102. In some embodiments, a diffuser 110 is provided between the light source 104 and the tank 102, such that the light rays 108 can be made to pass through the diffuser 110 before being optically collimated into parallel rays at the incident light surface 112. The diffuser 110 may be, for example, a light diffusing film. The light rays 108 then pass through RI fluid 114 located between the tank 102 and a dosimeter 116 that has been inserted into the tank 102. After passing through the dosimeter 116, the light rays 108 are focused by an exit light surface 118 toward a focal region where the detector 106 is located. In some embodiments, the detector can include a focusing lens 120. For clarity reasons, any rotation system (e.g., a rotation stage onto which the tank 102 can be placed) present has not been depicted.

Figure 4:
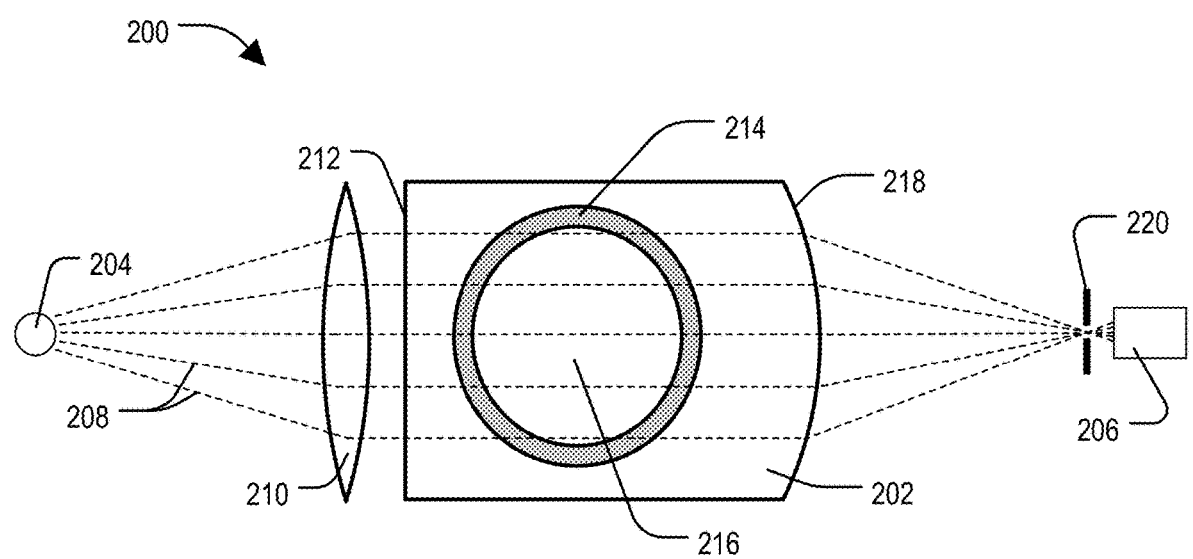
FIG. 4 depicts another optical computed tomography system in accordance with the teachings of the present disclosure.

FIG. 4 depicts a top view of another example of an optical computed tomography system 200 with a tank 202, a light source 204, and a detector 206. Light rays 208 are depicted as dotted lines and are emitted from the light source 204. The light rays 208 pass through a parallel collimator 210 where they are collimated into parallel rays before impinging on the flat incident light surface 212. In this depiction, the parallel collimator 210 is presented as an optical collimating lens, but could also be a parallel hole collimator or another collimator commonly known in the art. In some embodiments, a diffuser is provided between the light source 204 and the tank 202, such that the light rays 208 can be made to pass through the diffuser before being optically collimated into parallel rays by the parallel collimator 210. The light rays 208 then pass through RI fluid 214 located between the tank 202 and a dosimeter 216 that has been inserted into the tank 202. After passing through the dosimeter 216, the light rays 208 are then focused at an exit light surface 218 toward a focal region where the detector 206 is located. An aperture 220 is interposed between the exit light surface 218 and the detector 206. For clarity reasons, any rotation system (e.g., a rotation stage onto which the tank 202 can be placed) present has not been depicted.

Figure 5:
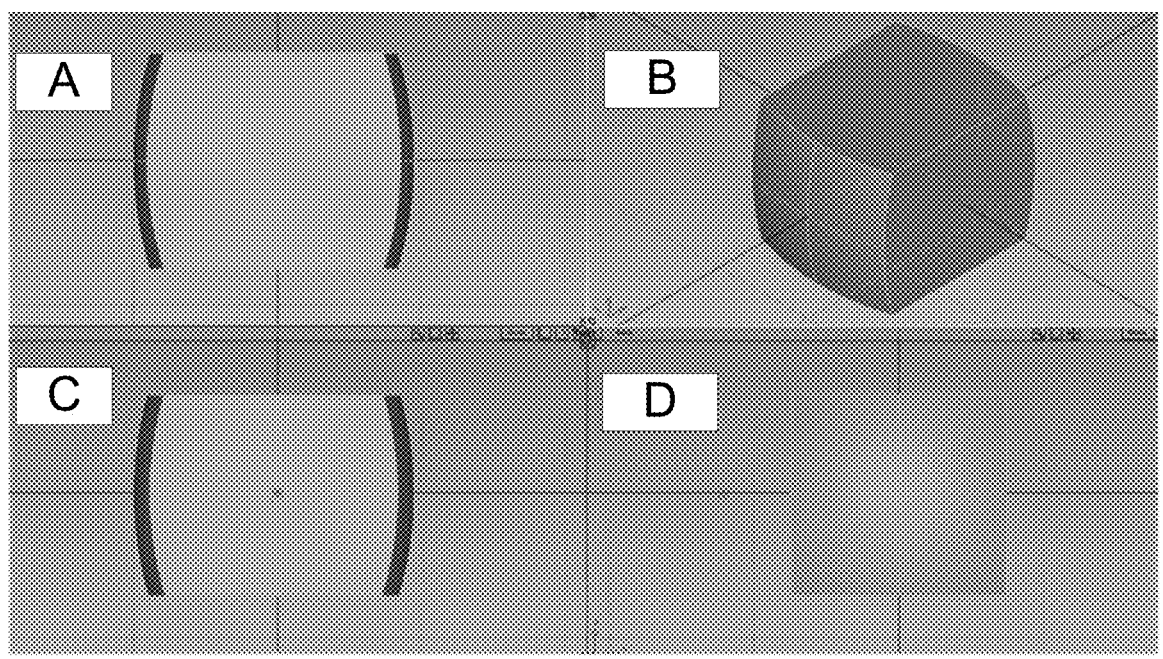
FIGS. 5A-5D depict a light-collimating tank geometrical design from a top view (FIG. 5A), orthographic view (FIG. 5B), side view (FIG. 5C), and front view (FIG. 5D), in accordance with the teachings of the present disclosure.

FIG. 5 depicts a light-collimating tank geometrical design for an optical computed tomography scanner in accordance with some embodiments of the present disclosure. For clarity reasons, the recessed region of the light-collimating tank is not depicted. The image depicts the light-collimating tank model from a top view (A), orthographic view (B), side view (C), and front view (D).

Figure 6:
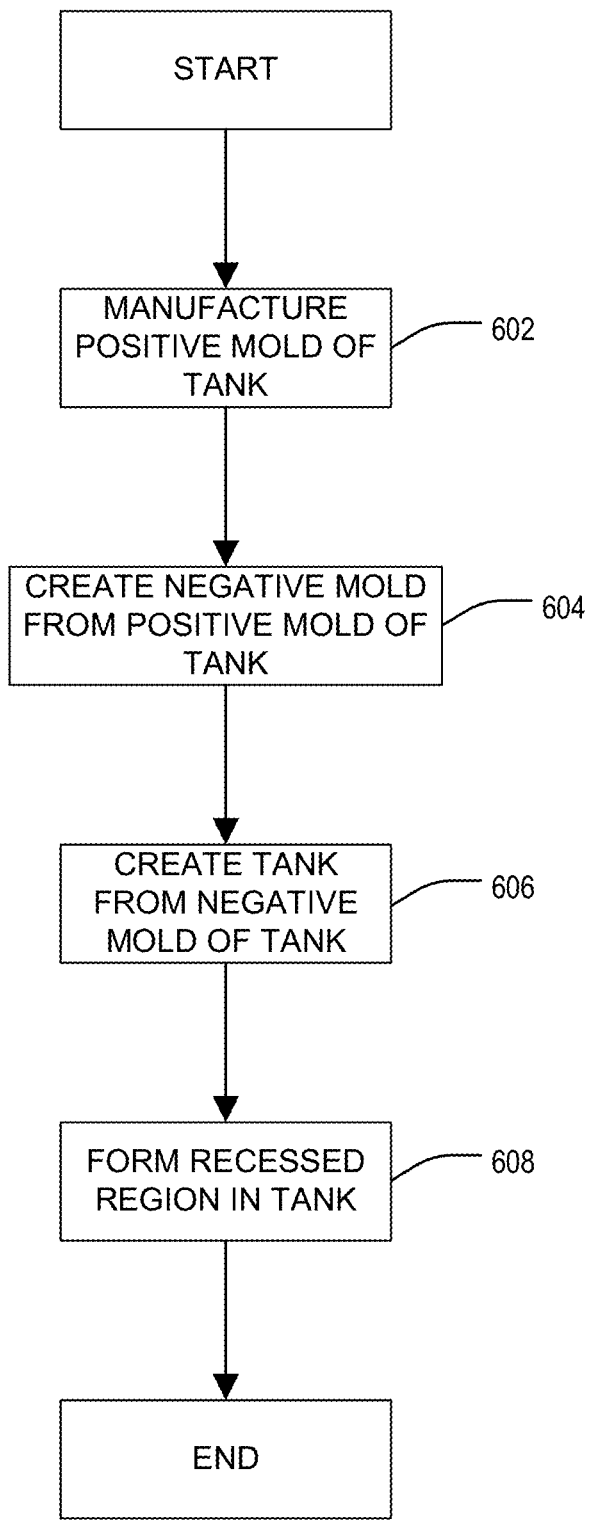
FIG. 6 depicts a method flow chart for making a light-collimating tank in accordance with the teachings of the present disclosure.

FIG. 6 depicts a flowchart setting forth the steps of an example method for making a light-collimating tank in accordance with some embodiments described in the present disclosure. The process includes manufacturing a positive mold of the tank, as indicated at step 602; creating a negative mold from the positive mold of the tank, as indicated at step 604; creating the tank from the negative mold of the tank, as indicated at step 606; and forming a recessed region in the tank, as indicated at step 608. The positive mold may be manufactured by machining a positive mold, such as by machining a positive mold from aluminum. In other implementations, the positive mold can be manufactured using 3D printing methods. In these instances, the 3D printing may occur using photopolymerization, extrusion deposition, or another common 3D printing technique. The negative mold may be formed using rubber casting or other such techniques. The negative mold may be configured to form the recessed region in the tank; in this manner, forming of the recessed region may occur simultaneously with the creation of the tank from the negative mold. Additional processing may occur after any of the method steps in order to correct deformities, remove excess material, or add additional components.

EXAMPLES

The following Examples are provided in order to demonstrate and further illustrate certain embodiments and aspects of the present disclosure and are not to be construed as limiting the scope of the disclosure.

Example 1

A light-collimating tank and optical computed tomography system were developed. To determine the approximate radius of curvature and focal distances necessary for the light-collimating tank, also referred to as the Duke Integrated-lens Optical Scanner ("DIOS"), a simulation study was performed in ScanSim, an in-house Monte Carlo optical-CT simulation software.

To properly simulate the DIOS geometry, the light-collimating tank scenario in ScanSim was adapted to include a diverging point light source. The fluid gap was expanded to simulate a large RI-matched spherical tank, neglecting the presence of an actual fluid gap. For a 1 kg cylindrical dosimeter (10 cm diameter), it was determined that an approximate radius of curvature of 25 cm and focal distances of approximately 50 cm, created suitably telecentric light transmission.

Because light rays travel parallel through the simulated tank, excess material may be cropped away to shorten ray paths and reduce the overall size of the scanner. ScanSim parameters were used to construct a 3D model of the solid tank in AliasDesign (Autodesk, Inc., San Rafael, Calif.).

The model from AliasDesign was exported as a 3-dimensional triangular surface mesh. The mesh was converted into a series of machine commands for a 3D printer using Cura, an open-source 3D model-to-toolpath software. A full-scale model was 3D printed in PLA on a Printrbot Metal Plus at 10% infill to conserve material and decrease the production time. However, 3D printing can often leave well-defined layer artifacts on an object. To correct this on the positive mold, the curved surfaces were capped with a thin layer of metal. These caps were cut from a ready-made, 50 cm diameter stainless steel globe, and attached to the printed mold using epoxy. The result was a positive mold for a convex scanner with pristine light-incident surfaces.

To create a fillable negative mold, the positive mold was placed in a large container and surrounded with a rubber molding solution. After the rubber solidified, the positive was removed to leave a recess, the negative mold. The resulting negative was filled with liquid polyurethane and cured, producing a usable solid scanning tank.

In this example configuration, the DIOS did not include a mechanism for rejecting scattered light due to imperfections in the lens curvature and the resultant design alterations. One method to quantify the extent of scatter at measurement, and resultant blurring, is by sampling the edge response of the system. To measure the response, half of the field of view was covered by a piece of light-blocking material, creating a well-defined 'edge' in the image. Scatter and blurring can be assessed by analyzing the light penumbra across the edge.

In an example study, a 1 kg cylindrical PRESAGE® dosimeter (10 cm diameter, 12 cm height) was imaged with the IDOS. An x-ray planning CT of the dosimeter was acquired and imported into Eclipse (Varian, Inc., Palo Alto, Calif.) for treatment simulation. A basic four-field box plan was developed, with two differently-weighted pairs of lateral-opposed fields to 32 create well-defined regions of three distinct doses. This plan was designed to deliver a cumulative dose of IGy to the dosimeter isocenter on a Varian Clinac at 6X.

Following irradiation, the dosimeter was tomographically imaged in the IDOS optical CT scanner, and reconstructed at 1 mm isotropic voxel resolution.

Median filters were applied to the image set to reduce the presence of noise, while preserving dose penumbra information. 3D gamma analysis between the IDOS dosimeter and treatment plan showed 95% of voxels passing at 3%/3 mm criteria. Cross-scanner 3D gamma analysis showed 88.1% of voxels passing at 5%/1 mm, where most regions of failure were localized to the dosimeter edges.

The present disclosure has described one or more preferred embodiments, and it should be appreciated that many equivalents, alternatives, variations, and modifications, aside from those expressly stated, are possible and within the scope of the invention.

The invention claimed is:

1. A light-collimating tank for an optical computed tomography scanner, comprising:
   a transparent substrate having a recessed region formed therein;
   an incident light surface formed on a first side of the transparent substrate; and
   an exit light surface formed on a second side of the transparent substrate that is opposite the first side, the exit light surface being shaped to focus light toward a focal region located outside of the transparent substrate.

2. The light-collimating tank as recited in claim 1, wherein the incident light surface is shaped to collimate light incident on the incident light surface into parallel rays that pass through the recessed region of the transparent substrate toward the exit light surface.

3. The light-collimating tank as recited in claim 2, wherein the incident light surface is shaped into a convex lens.

4. The light-collimating tank as recited in claim 2, wherein the incident light surface is shaped into a Fresnel lens.

5. The light-collimating tank as recited in claim 1, further comprising a parallel collimator arranged at the incident light surface such that light incident on the parallel collimator is collimated into parallel rays that impinge upon the incident light surface.

6. The light-collimating tank as recited in claim 5, wherein the parallel collimator is a parallel-hole collimator.

7. The light-collimating tank as recited in claim 5, wherein the parallel collimator is a collimating lens.

8. The light-collimating tank as recited in claim 1, wherein the transparent substrate comprises polyurethane.

9. The light-collimating tank as recited in claim 1, wherein the exit light surface is shaped into a convex lens.

10. The light-collimating tank as recited in claim 1, wherein the recessed region is cylindrical in shape.

11. An optical computed tomography system, comprising:
    a light source that emits light;
    a detector that detects light; and
    a tank arranged between the light source and the detector, comprising:

a transparent substrate having a recessed region formed therein;

an incident light surface formed on the transparent substrate;

an exit light surface formed on the transparent substrate opposite the incident light surface and shaped to focus light toward the detector.

12. The optical computed tomography system as recited in claim 11, wherein the incident light surface is shaped to collimate light incident on the incident light surface into parallel rays that pass through the recessed region of the transparent substrate toward the exit light surface.

13. The optical computed tomography system as recited in claim 11, further comprising a parallel collimator arranged at the incident light surface such that light incident on the parallel collimator is collimated into parallel rays that impinge upon the incident light surface.

14. The optical computed tomography system as recited in claim 11, wherein the light source comprises a light emitting diode.

15. The optical computed tomography system as recited in claim 14, wherein the light source comprises an array of light emitting diodes.

16. The optical computed tomography system as recited in claim 11, wherein the detector further comprises a focusing lens interposed between the exit light surface and the detector to refocus scattered light exiting the exit light surface to impinge onto the detector.

17. The optical computed tomography system as recited in claim 11, further comprising an aperture interposed between the exit light surface and the detector.

18. The optical computed tomography system as recited in claim 11, further comprising a rotation stage onto which the tank is positioned such that when the rotation stage is rotated the tank is similarly rotated through a plurality of different view angles.

19. The optical computed tomography system as recited in claim 11, wherein the transparent substrate is composed of a material having a refractive index that is matched to a refractive index of a dosimeter to be placed into the recessed region for optical scanning.

20. The optical computed tomography system as recited in claim 11, further comprising a diffuser located between the light source and the incident light surface of the tank.

21. The optical computed tomography system as recited in claim 20, further comprising a parallel collimator positioned between the diffuser and the incident light surface of the tank.

22. The optical computed tomography system as recited in claim 21, wherein the parallel collimator is a parallel-hole collimator.

23. The optical computed tomography system as recited in claim 21, wherein the parallel collimator is a collimating lens.

* * * * *